No. 828,305. PATENTED AUG. 14, 1906.
E. DAVIS & W. DELLINGER.
WHEEL SCRAPER.
APPLICATION FILED MAY 17, 1905.

Witnesses
F. A. Barron
M. A. Schmidt

Edward Davis
William Dellinger
Inventors
by
Milo B. Stevens & Co. Attorneys

UNITED STATES PATENT OFFICE.

EDWARD DAVIS AND WILLIAM DELLINGER, OF AVALON, TEXAS.

WHEEL-SCRAPER.

No. 828,305.     Specification of Letters Patent.     Patented Aug. 14, 1906.

Application filed May 17, 1905. Serial No. 260,811.

*To all whom it may concern:*

Be it known that we, EDWARD DAVIS and WILLIAM DELLINGER, citizens of the United States, residing at Avalon, in the county of Ellis and State of Texas, have invented new and useful Improvements in Wheel-Scrapers, of which the following is a specification.

Our invention is a wheel-scraper, and has for its object to provide a device of this kind embodying simplicity of construction and efficiency of operation; and to this end it consists in certain novel features of construction hereinafter described and claimed.

Figure 1:
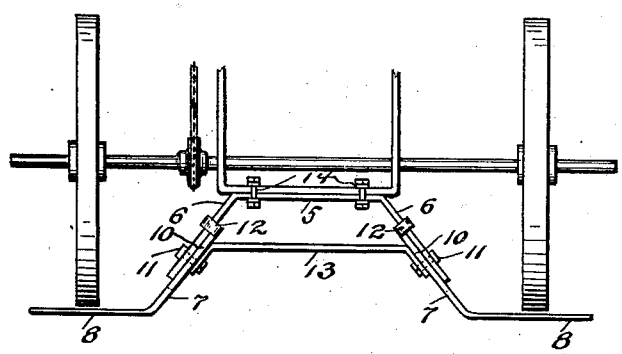
Figure 2:
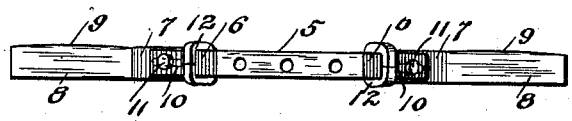

In the accompanying drawings, Figure 1 is a plan view of the rear end of a planter provided with our scraper. Fig. 2 is a plan view of the scraper detached.

Referring specifically to the drawings, 5 denotes a bar having its ends bent outwardly to form divergent arms 6. These parts form a bracket whereby the scraper is secured to the machine. The scraper comprises a shank 7, having at its outer end a laterally-extending flat blade 8, provided with a cutting edge 9. One of these scrapers is fastened to each of the arms 6, a scraper being provided for each wheel.

The shanks 7 are slotted, as at 10, and are secured to the arms 6 by bolts 11 extending through said parts. This construction permits adjustment of the scrapers to or from the wheels. The inner ends of the shanks are formed with flanges 12, which are bent to extend around the arms 6 and assist in holding the scrapers in position. A brace 13 extends between the arms 6, its outer ends being apertured to receive the bolts 11, the latter thus serving to secure the scrapers and also the brace.

The invention is attached to the machine by fastening the bar 5 to the frame thereof by clips 14 or in any other suitable manner, depending on the construction of the machine.

In the drawings the invention is shown in connection with a planter; but it can be readily applied to other farm machinery, as well as to vehicles. When the blades become dull, they can be readily removed for sharpening. The slotted construction enables the blades to be set closer to or away from the wheel to suit different conditions of ground, and this also permits the device to be applied to different-sized wheels.

The blades 8 are made of sufficient length to permit the usual adjustment of the planter-wheels, and as they are flat the mud will not stick thereon and thus cause choking.

Having thus described our invention, what is claimed as new, and desired to be secured by Letters Patent, is—

A wheel-scraper comprising a bar fastened to the vehicle or machine, and having divergent arms at its ends, slotted shanks having scraper-blades at their outer ends, and flanges at their inner ends bent over the edges of the bar, a brace extending across between the arms, and bolts connecting the ends of the brace, the arms and the shanks.

In testimony whereof we have signed our names to this specification in the presence of two subscribing witnesses.

EDWARD DAVIS.
         WILLIAM DELLINGER.

Witnesses:
    M. L. PAYNE,
    E. GREEN, Jr.